Aug. 20, 1940.　　　　T. B. CHACE　　　　2,211,922

METHOD OF PRODUCING CLAD METAL PRODUCTS

Filed Aug. 12, 1937　　　5 Sheets-Sheet 1

Preheated Backing Slab Being Withdrawn from Molten Bath of Slag or Flux.

Backing Slab in Transit to Mould

Inventor
Thomas B. Chace
By: Brown, Jackson, Boettcher & Dienner
Attys.

Aug. 20, 1940.　　　T. B. CHACE　　　2,211,922
METHOD OF PRODUCING CLAD METAL PRODUCTS
Filed Aug. 12, 1937　　5 Sheets-Sheet 2
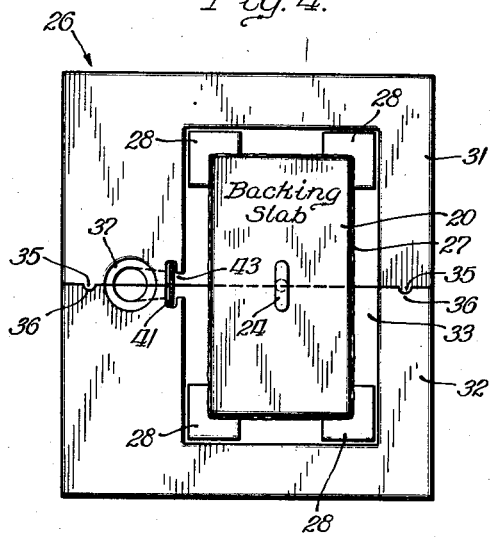
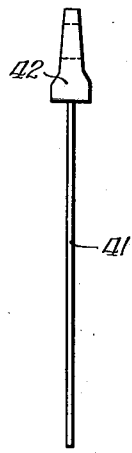
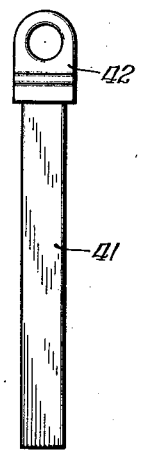
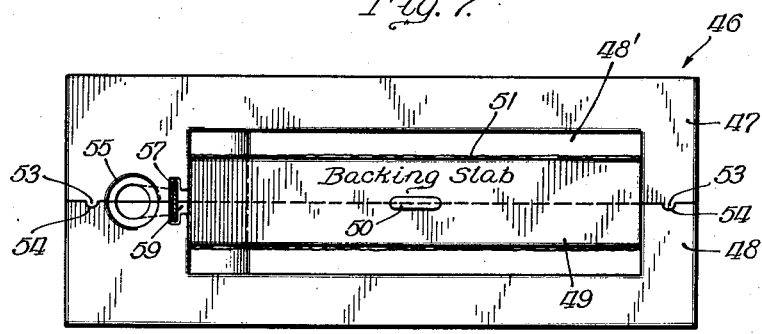
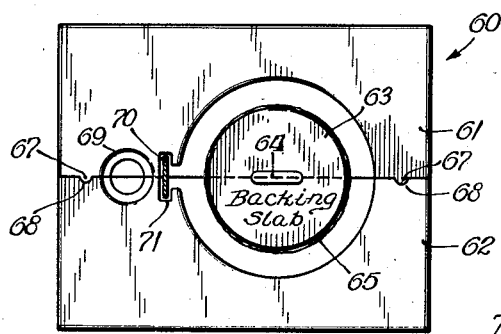
Inventor
Thomas B. Chace
By:
Attys.

Aug. 20, 1940. T. B. CHACE 2,211,922
METHOD OF PRODUCING CLAD METAL PRODUCTS
Filed Aug. 12, 1937 5 Sheets-Sheet 3

Inventor:
Thomas B. Chace
By: [signature] Attys.

Aug. 20, 1940.　　　T. B. CHACE　　　2,211,922
METHOD OF PRODUCING CLAD METAL PRODUCTS
Filed Aug. 12, 1937　　　5 Sheets-Sheet 4
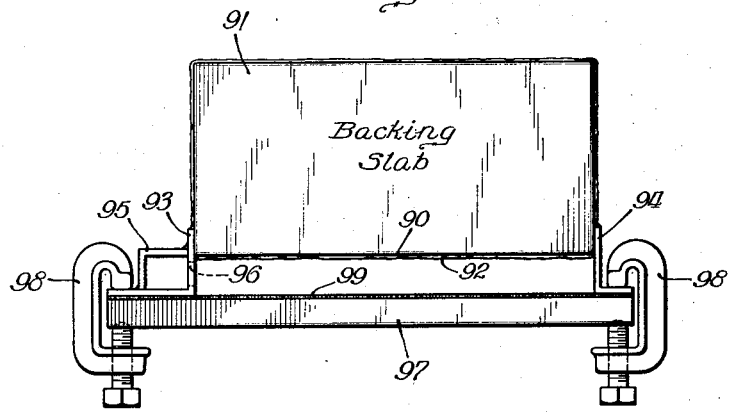
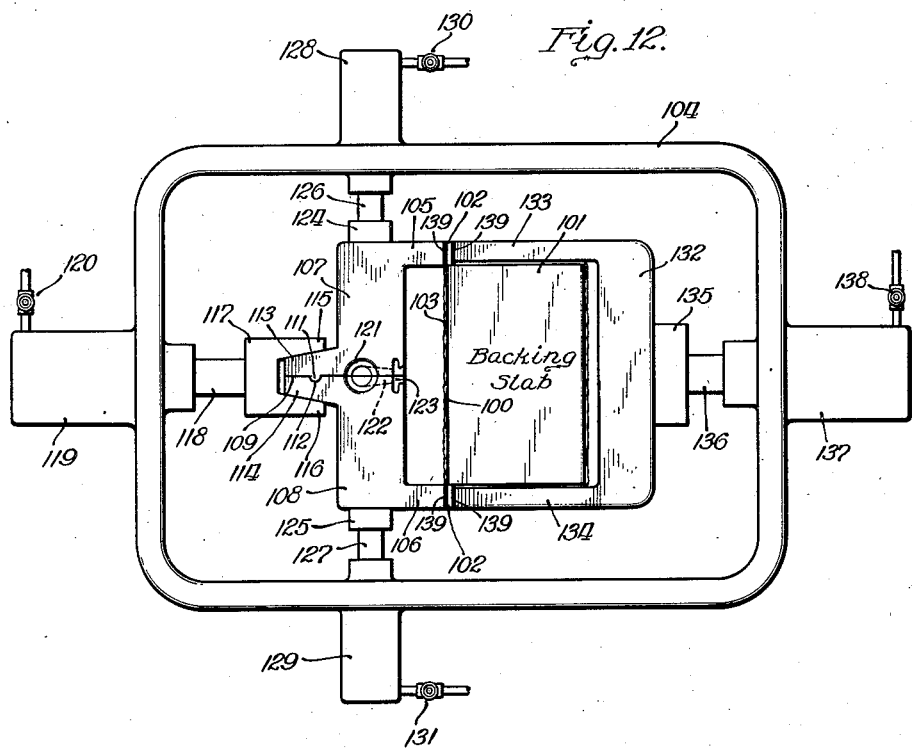
Inventor:
Thomas B. Chace Aug. 20, 1940.   T. B. CHACE   2,211,922
METHOD OF PRODUCING CLAD METAL PRODUCTS
Filed Aug. 12, 1937   5 Sheets-Sheet 5

Inventor:
Thomas B. Chace

Patented Aug. 20, 1940

2,211,922

UNITED STATES PATENT OFFICE 2,211,922

METHOD OF PRODUCING CLAD METAL PRODUCTS

Thomas B. Chace, Winnetka, Ill., assignor to Clad Metals Industries, Inc., Chicago, Ill., a corporation of Illinois Application August 12, 1937, Serial No. 158,656

7 Claims. (Cl. 22—204)

My invention relates, generally, to methods of manufacturing composite metal slabs and it has particular relation to the making of such slabs by casting a cladding metal onto one or more surfaces of a backing slab disposed in a vertical mould.

Another important object of my invention is to provide improved methods of cladding facing metal onto a backing metal by casting in vertical moulds to obtain a diffused bond between the facing metal and the backing metal that is capable of being worked without the cladding metal separating from the backing metal.

Another object of my invention is to provide for cladding opposite faces of a steel backing slab with different facing metals and particularly with facing metals having different melting temperatures.

A further object of my invention is to provide an improved separable mould construction for retrieving a pre-heated backing slab that is adapted for vertical casting therein of metal for cladding one or more of the surfaces of the backing slab.

Still another object of my invention is to provide for bottom pouring of the cladding metal in the improved mould constructions.

Other objects of my invention will, in part, be obvious and in part appear hereinafter.

Accordingly, my invention is disclosed in the embodiments thereof as shown in the accompanying drawings and it comprises the method of operation, features of construction, combination of elements, and arrangement of parts which will be exemplified as hereinafter set forth, and the scope of the application of which will be indicated in the appended claims.

For a more complete understanding of the nature and scope of my invention, reference may be had to the following detailed description taken in connection with the accompanying drawings, in which:

Figure 4 is a top plan view of the mould and backing slab shown in Figure 3;

Figures 5 and 6 are respectively side and front elevation views of a gate that may be applied in connection with the various types of mould shown in the drawings;

Figure 7 is a top plan view of a mould that is arranged to clad the opposite sides of a backing slab;

Figure 9 is a top plan view of a separable mould for casting cladding metal onto the surface of a cylindrically shaped backing slab;

Figure 11 shows a modified form of the mould construction shown in Figure 10;

Figure 12 shows still another form of mould construction for casting cladding metal onto only one surface of a backing slab;

Figure 1:
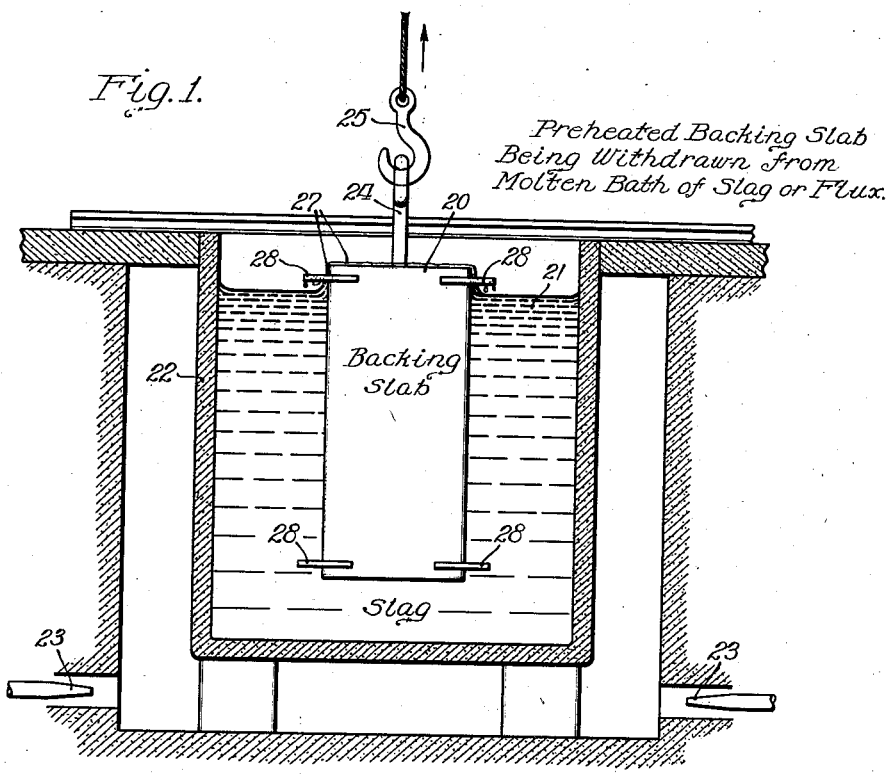
Figure 1 is a vertical sectional view of a soaking pit in which a slab of backing metal is preheated in a flux or slag bath.
Figure 2:
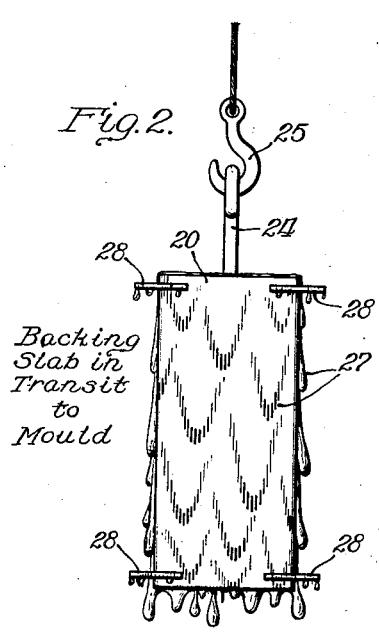
Figure 2 shows how the surface of the backing slab is prevented from contacting with the air by the coating of slag or flux while it is being transferred from the soaking pit to the mould.
Figure 3:
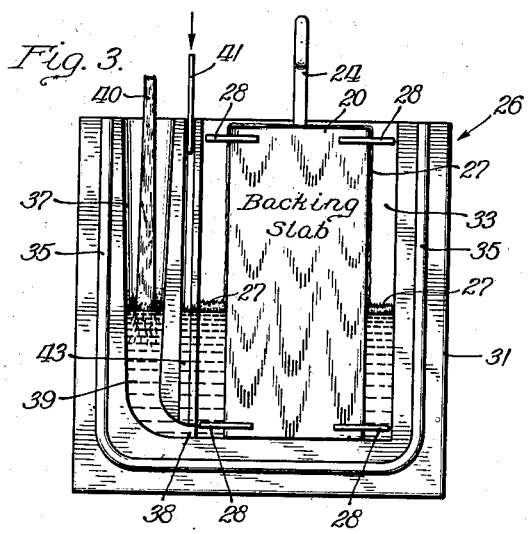
Figure 3 is a vertical sectional view of one embodiment of the improved mould construction showing the backing slab in place and the cladding metal being poured.

With a view to practicing my invention, a steel backing slab 20, Figure 1, of suitable size is cleaned on the welding surfaces, preferably by sand blasting, and then is lowered into a molten bath 21 of viscous substance in a suitable container 22 that is heated by any suitable means, such as by gas supplied by the nozzle 23, to maintain it in the molten state for preheating the backing slab 20. An eye 24 may be threaded into the top of the backing slab 20 to permit it being picked up by a hook 25 of a crane for lifting the backing slab 20 into and out of the container 22. After the backing slab 20 has been preheated to the desired extent, it is removed from the container 22 and transported to the mould shown generally at 26 in Figures 3 and 4 of the drawings. As shown at 27 in Figure 2, the surfaces of the backing slab 20 are covered by a layer 27 of the material forming the bath 21 so that, during transit to the mould 26, the surfaces are prevented from coming into contact with the air and are, therefore, not oxidized. With a view to centering the backing slab 20 in the space provided therefor in the mould 26, guide members 28, in the form of steel plates, may be welded to the upper and lower corners, as illustrated, thereby insuring that a coating of substantially uniform thickness will be applied to the backing slab. Preferably the guide members 28 are welded into place before the backing slab 20 is sand blasted.

The exact chemistry of the bath 21 is dependent on the combinations of metals to be clad and the required preheating temperatures. The required properties are a relatively low melting temperature and a relatively high viscosity at temperatures well above the melting temperature. For instance, for preheating temperatures around 2300° F. I have found that a mixture of about 80% borax and 20% by weight boric acid to be suitable. The fusing temperature and viscosity af the bath 21 can be increased by adding more borax, silicic acid, or quartz. It can be decreased by increasing the boric acid content. A base of cullet (broken glass) with boric acid added to decrease the viscosity has been found usable. The bath 21 is in the form of slag or flux. The melting temperature of the bath 21 should be low enough so that, when it is heated to about 2300° F., it does not chill below its fusing temperature when the cold backing slab 20 is lowered into it.

The backing slab 20 is left in the bath 21 of slag or flux until it is thoroughly preheated. The time required is usually about one hour for each inch of thickness of the slab 20. During preheating the surfaces of the slab 20 are perfectly sealed from the atmosphere by the bath 21 and, on removing it therefrom for transporting it to the mould 26, a layer of the slag or flux forming the bath 21 of about $\frac{3}{32}$ of an inch in thickness clings to its surfaces as indicated at 27 in Figure 2. As a result of numerous tests on slabs preheated in a bath 21 having the correct proportions, I have found, on cooling the slab to room temperature, that its surface under the coating 27 is clean and entirely free from oxidation the layer 27 of slag or flux hardens on cooling below its melting temperature and breaks off readily. However, during transit of the slab 20 from the bath 21 to the mould 26 or until the layer 27 is cooled below its melting temperature, it clings to the surface of the slab 20 and will stand relatively rough handling without exposing the surfaces to which cladding metal is to be applied. If the slab 20 is scraped against an object during transit to the mould 26, the layer 27 parts but it quickly closes before any oxidation can take place. Of course, the stored heat in the preheated slab 20 will keep the layer 27 viscous for a relatively long time so that it is unnecessary to take special precaution for very quickly transferring the slab 20 from the bath 21 to the mould 26.

As shown in Figure 4 of the drawings, the mould 26 comprises two sections 31 and 32 which, when fitted together, provide the mould space 33 for receiving the backing slab 20. The opposing faces of the sections 31 and 32 are provided with a tongue 35 and a groove 36 respectively to prevent the escape of the cladding metal along the parting line of the mould 26. If desired, suitable clamps may be provided for insuring that the sections 31 and 32 will not be separated while the cladding metal is being poured. Suitable clamping arrangements will be described hereinafter.

It is preferable to provide for bottom pouring of the cladding metal and for this purpose I have provided a pouring sprue or spout 37 having at its lower end a gate 38 that opens into the mould space 33. The cladding metal 39 is poured into the sprue or spout 37, as indicated by the stream of molten cladding metal 40, and it fills the mould space 33 from the bottom. As the cladding metal 39 rises to the top of the mould space 33, the slag or flux from the bath 21 as indicated by the reference character 27 and other inclusions will float to the surface readliy as indicated. It will be observed that the pouring sprue or spout 37 is positioned along the parting line between the two sections 31 and 32 of the mould 26. This arrangement facilitates the separation of the two sections 31 and 32 after the cladding metal has solidified.

In order to further facilitate the removal of the mould sections 31 and 32, a valve member 41, Figures 5 and 6, having a handle 42 at its upper end, is adapted to be slidably mounted in a suitable groove 43 that, as shown in Figure 4, opens into the mould space 33. The valve 41 may be formed of a suitable piece of steel strip and at its lower end it is arranged to completely close the gate 38. On cooling of the cladding metal 39, the portion thereof that remains in the pouring sprue or spout 37 will be separated from the rest of the cladding metal in the mould 26.

In order to prevent the cladding metal 39 from welding to the surfaces of the mould 26 with which it comes in contact and to the valve member 41, these surfaces are provided with a suitable material, such as graphite, before the backing clab 20 is inserted. The cladding metal then welds only to the surfaces of the backing slab 20 in the intended manner, and it is a simple matter to remove the mould 26 therefrom.

The cladding metal 39 is generally of the character that cannot be readily cast in a mould of the open face type. This is particularly true when the composite slab is intended to have a smooth rollable surface after casting and bonding of the facing metal onto the backing slab so that they will not separate on subsequent working. Metals, such as pure copper, and alloys, such as high nickel-copper alloys and copper-nickel-zinc alloys in the molten state, are very susceptible to the occlusion of gases and form a thick dross on the upper surface. Such metals and alloys should be cast in a vertical mould, of the type shown in Figures 3 and 4 of the drawings, for cladding to the steel backing slab 20 so that the unrollable part is formed on the upper end of the composite slab rather than on a rolling surface.

I have found that other copper alloys, such as silicon-nickel-copper alloys, can be readily cast onto backing slabs in accordance with my invention. The nickel in these alloys is employed to facilitate bonding to the backing slab and the silicon-nickel in combination forms nickel silicides for the purpose of making the copper more refractory so that it has substantially the same compression resistance in rolling or working as the steel backing slab. This is of particular importance for proper clad steel that is clad on two or more sides since such composite slabs are often rolled into products such as I beams, Z bars, and the like on suitably shaped rolls. Such products require diamond, oval, and other irregular shaped passes and, of course, it is essential that the two metals forming the composite slab elongate the same amount for each pass. In order to accomplish this, I vary the silicon and nickel content of the copper facing alloy to suit the carbon content of the steel. For example, the resistance to compression or force of the rolls with the same compression rate at 1600° F. for wrought iron of about 0.02% carbon, mild steel of about 0.08% and medium steel of about 0.45% carbon is respectively 14,000, 21,000, and 33,000 pounds per square inch. To secure the same properties in the composite slab so that it rolls as if it were made of a single metal, I use with wrought iron of about 0.02% to 0.04% carbon a copper alloy of approximately 0.25% to 0.50% silicon and 0.60% to 0.75% nickel. For mild steel having a carbon content of from 0.08% to 0.12% I use 0.50% to 0.90% silicon and 1.0% to 1.25% nickel. For medium steel having a carbon content from 0.25% to 0.45% I use approximately 1.2% to 1.5% silicon and 1.5% to 2.0% nickel. I find that, if the nickel content is kept slightly in excess of the silicon content, bonding is greatly facilitated without requiring any extended soaking with the copper in the molten state. This also seems to eliminate any hot or cold short ranges in annealing or rolling.

Figure 8:
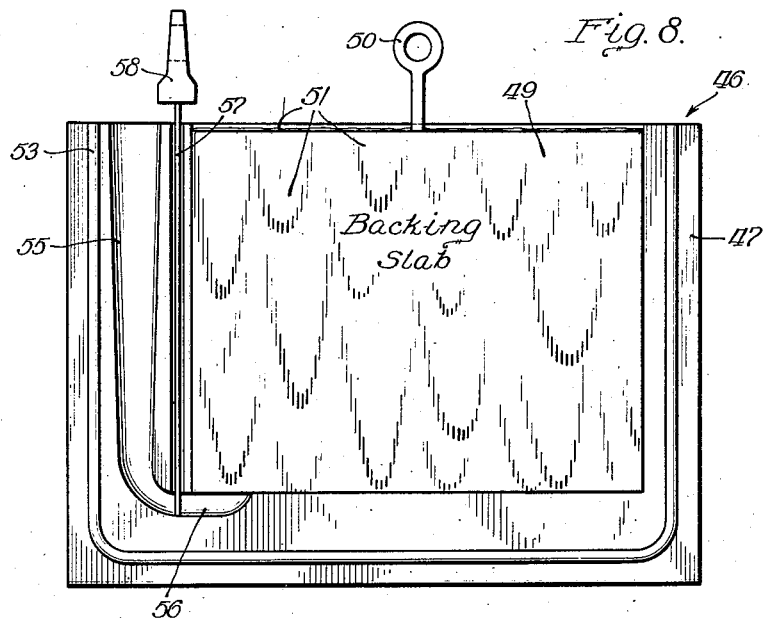
Figure 8 is a view, in side elevation, of the construction shown in Figure 7, one half of the separable mould having been removed to show the details of construction.

In Figures 7 and 8 of the drawings, I have illustrated a mould, shown generally at 46, that comprises sections 47 and 48 for receiving in the mould space 48' provided thereby a backing slab 49. In this embodiment of the invention a backing slab 49 is to be provided with cladding metal on two sides only and, therefore, the sides that are not intended to be clad are arranged to snugly fit against the ends of the mould space 48, as illustrated. A suitable eye 50 is provided for lifting the backing slab 49 from the preheating bath, such as the bath 21 shown in Figure 1, to the mould 46. The layer 51 of slag or flux from the bath serves to protect the welding surfaces of the backing slab 49 from oxidation, as previously described. The sections 47 and 48 are provided respectively with a tongue 53 and a groove 54 to prevent escape of the molten cladding metal along the parting line of the mould. A pouring sprue or spout 55 is provided having a gate 56 at the bottom to provide for bottom pouring of the cladding metal into the mould space 48 for the reasons set forth hereinbefore. It will be observed that the gate 56 extends across the bottom of the mould space 48 to permit the flow of the molten cladding metal into the spaces between the surfaces of the backing slab 49 to be clad and the opposite walls of the mould sections 47 and 48. A suitable valve member 57 having a handle 58 is provided in a suitable recess 59 for separating the molten cladding meal in the pouring sprue or spout 55 and the gate 56 to facilitate removal of the backing slab 49 after the metal has solidified.

In Figure 9 of the drawings I have illustrated a separable mould 60 comprising sections 61 and 62 that is of the same general construction as described hereinbefore but which is especially designed for applying cladding metal to the surface of a backing slab 63 having a generally cylindrical shape. As shown, the backing slab 63 is provided wih an eye 64 for lifting it into and out of the preheating bath, such as the bath 21 shown in Figure 1, and transporting it to the mould 60. During transit the backing slab 63 is protected by the layer 65 of slag or flux that is picked up from the bath 21 as previously described. The sections 61 and 62 may be provided with an interfitting tongue 67 and groove 68 along the parting line to prevent escape of the cladding metal in the molten state. A pouring sprue or spout 69 is provided along the parting line for bottom pouring of the cladding metal, and a valve member 70, similar to the valve member 41, Figures 5 and 6, may be provided in a suitable groove 71 for segregating the cladding metal in the pouring sprue or spout 69 from that in the gate for the reasons set forth hereinbefore.

Figure 10:
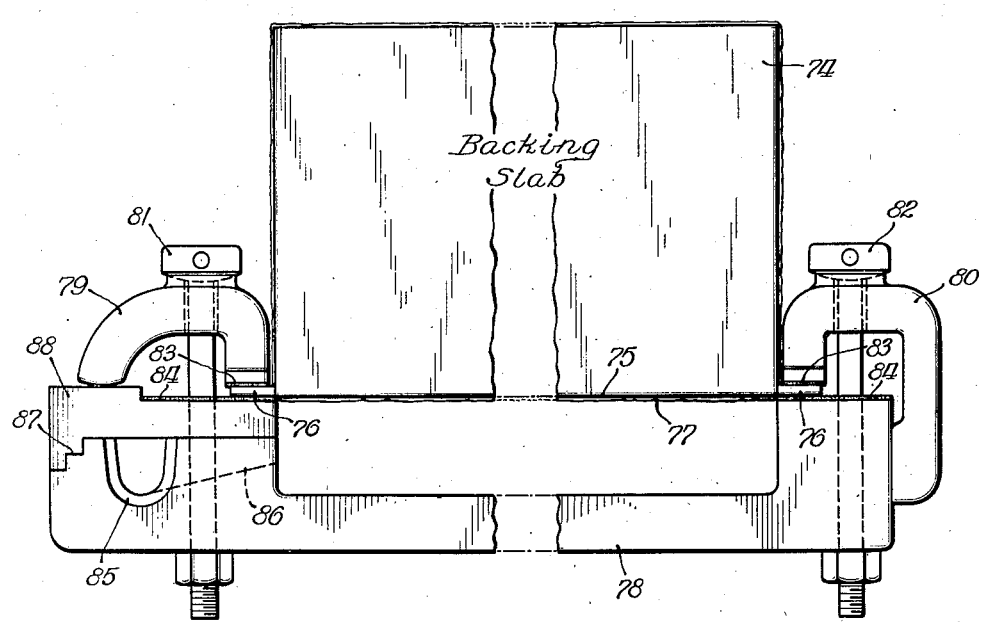
Figure 10 is a top plan view of a mould construction that may be employed for cladding only one face of a backing slab.

In Figure 10 of the drawings I have shown a mould construction that is suitable for vertically casting the cladding meal on one surface only. Provision for cladding one surface only of the backing slab presents a difficult problem in mould design since it is not easy to hold the highly heated molten facing metal in contact with the preheated backing slab and confine it to one surface only. The problem differs from ordinary casting in that the facing metal usually has to be heated to relatively high temperatures well above the melting temperature and, since the backing slab is preheated to a high temperature, the facing metal remains molten for a comparatively long period during which it must be confined. Even if it were practical to fit the backing slab into a mould while both were cold, it would necessitate heating the mould during preheating of the slab which, of course, would shorten the life of the mould considerably, and then, too, there is the problem of expansion of the slab in the mould during preheating which must be taken into account. The futility of attempting to fit a large preheated slab of one thousand pounds or over into a conventional type mould and sealing the edges so that the molten facing metal is confined to one surface only is quite obvious.

With a view to solving this problem and cladding the backing slab 74 on one surface 75 only, I weld along the two sides of this surface comparatively thin steel strips 76. It will be observed that these strips 76 are generally aligned with the surface 75 so that they present a continuation thereof. These strips 76 are welded along two sides only of the backing slab 74 since, for casting purposes, it may be removed from the soaking pit, for example from the molten bath 21, Figure 1, and placed in an upright position on a casting floor formed of sand. The sand then forms the bottom of the mould space. The surfaces of the slab 74 and particularly the welding surface 75 are protected from oxidation by the layer 77 of slag or flux, as previously described.

The mould space is completed by a mould member 78 that is generally in the form of a half section of a conventional mould. The ends of the mould member 78 that are turned inwardly are juxtaposed with the thin steel strips 76 and are clamped thereto by suitable clamp members 79 and 80 that may be drawn up and clamped in place by suitable bolts 81 and 82, as illustrated. The surfaces between the mould member 78 and the steel strips 76 and between the clamps 79 and 80 and these thin steel strips 76 are lined with asbestos gaskets 83 and 84 to not only seal the mould but also to keep the mould member 78 and the clamps 79 and 80 from welding to the steel strips 76, thereby permitting the ready removal of these parts as soon as the facing metal has solidified.

In order to pour the facing metal into the mould space formed between the surface 75 of the backing slab 74 and the inner surface of the mould member 78, a pouring sprue or spout 85 is provided in the lefthand end of the mould member 78, as illustrated. A gate 86, opening into the mould space is provided at the bottom of the sprue or spout 85 to permit bottom pouring. It will be noted that the lefthand end of the mould member 78 is split to provide a parting line 87 formed between the mould member 78 proper and a spacer member 88. Since the spacing member 88 readily separates from the remainder of the mould member 78 after the facing metal has solidified in the sprue or spout 85 and gate 86, it is a relatively simple matter to remove this solidified metal and prepare the mould for re-use.

In operation the backing slab 74 is preheated in the bath of slag or flux, as described hereinbefore, until it has reached the desired temperature. It is then picked up by a suitable crane and deposited on the casting floor in an upright position. The mould member 78 and the spacer member 88 are then assembled and clamped to the thin steel strips 76, the clamping being effected from the cold side of the mould member 78, as will be readily understood. The molten facing metal is then poured into the sprue or spout 85 and it runs through the gate 86 into the mould space, the bottom of which is formed by the sand of the floor. After the cladding metal has solidified, the bolts 81 and 82 are loosened and the mould member 78 and the spacer member 88 are removed. This leaves the cladding metal and the portion thereof that had solidified in the sprue or spout 85 and the gate 86 integral with the backing slab 74. Since the gate 86 is relatively small, it is a simple matter to break off the portion of the cladding metal that was cast in the sprue or spout 85 and the gate 86. The composite slab then is ready for rolling by standard steel mill rolling practice.

One great utility of the type of mould construction shown in Figure 10 is that spacers of various thicknesses can be used between the mould member 78 and the steel strips 76 or the backing slab 74 to increase the mould casting space. In other words, a standard width backing slab 74 can be used and the thickness of the backing slab can be varied within a wide range, and, at the same time, the casting space for the facing metal can also be varied by suitable spacers as desired in order to provide the proper relative thickness of facing metal and backing slab. This arrangement eliminates the necessity for a large stock of mould sizes since, if the thickness of the composite slab can be readily varied, it can be rolled to suit width and length variables in the finished product.

In Figure 11 of the drawings I have illustrated another form of mould construction that is suitable for casting the cladding metal on one surface 90 only of a backing slab 91. As described hereinbefore, the backing slab 91 is first preheated in a suitable bath of slag or flux and its surfaces, at least the surface 90, is protected from oxidation by layer 92 of the slag or flux. Prior to preheating of the backing slab 91 relatively thin steel angles 93 and 94 are welded to opposite sides of the backing slab 91 along the edges of the surface 90 that is to be clad. Another angle 95 is welded in the corner formed by the flanges of the angle 93 to provide a pouring sprue or spout. At the lower end an aperture 96 is provided in one of the flanges of the angle 93 to provide a gate for the molten cladding metal. The mould space formed by the surface 90 and the opposite flanges of the angles 93 and 94 is completed by a plate 97, the edges of which may be clamped to the angles 93 and 94 by suitable C-clamps 98, as illustrated. A liner 99 of suitable material, such as asbestos, may be provided on the inside surface of the plate 97 to prevent its being welded to the angles 93 and 94 and the cladding metal being welded to it.

In Figure 12 of the drawings I have illustrated a mould construction that may be readily applied for casting cladding metal on one surface 100 only of a backing slab 101 that may be remotely operated so that it is unnecessary for one to closely approach the preheated backing slab. Prior to cleaning and preheating the backing slab 101, relatively thin steel strips 102 are welded along the edges of the surface 100. The backing slab 101 is then preheated in a suitable bath of slag or flux and when lifted therefrom and placed on the casting floor, the layer 103 of slag or flux protects the surface 100, at least, from oxidization.

The backing slab 101 may be positioned within a suitable frame 104 on the casting floor that is provided for purposes which will be presently apparent. The mould space is formed by juxtaposing the arms 105 and 106 of the mould pieces 107 and 108 with the steel strips 102, as illustrated. The mould pieces 107 and 108 are separated along a parting line 109 and are provided respectively with a tongue 111 and a groove 112 to prevent egress of the molten cladding metal. The mould pieces 107 and 108 are held or clamped together by integrally formed wedge-shaped portions 113 and 114 that interfit with the outwardly flared jaws 115 and 116 of a head 117 which is carried by a plunger 118. The plunger 118 forms a part of a suitable hydraulic ram 119 that may be supplied from any suitable source of fluid pressure through a valve 120. By applying fluid pressure to the ram 119, the head 117 is forced toward the backing slab 101 and thereby not only holds the mould pieces 107 and 108 in position but also, by virtue of the clamping action between the jaws 115 and 116 and the wedge-shaped portions 113 and 114, these mould pieces 107 and 108 are maintained in the desired relation.

Along the parting line 109 a pouring sprue or spout 121 is provided having a gate 122 at the bottom to provide for bottom pouring of the cladding metal. A groove 123 is provided for receiving a suitable valve member, such as the valve member 41 shown in Figures 5 and 6, for separating the molten metal in the sprue or spout 121 and the gate 122 from the cladding metal in the mould space. It will be understood that the valve member will be inserted in the groove 123 and that it will be moved downwardly to separate the two portions of molten cladding metal when the mould space has been filled.

It will be observed that the hydraulic ram 119 is mounted on the frame 104. With a view to further providing for facilitating the handling of the mould pieces 107 and 108, heads 124 and 125 mounted on plungers 126 and 127 of additional hydraulic rams 128 and 129, carried by the frame 104, are provided for engaging the opposite sides of these pieces as illustrated. Valves 130 and 131 are provided for controlling the application of fluid pressure to the hydraulic rams 128 and 129.

Since the relatively thin steel strips 102 may be bent on application thereto of pressure on movement of the mould pieces 107 and 108 by the hydraulic ram 119, it is desirable that some means be provided for preventing this distortion. For this purpose a generally C-shaped member is provided, the arms 133 and 134 of which are arranged to engage the rear side of the steel strips 102, as illustrated. The C-shaped member 132 may be carried by a head 135 that is supported on a plunger 136 of a hydraulic ram 137. A valve 138 may be provided for supplying suitable fluid pressure to the ram 137. Suitable strips 139 of asbestos or the like may be disposed along the opposite faces of the steel strips 102 that are engaged by the arms 105 and 106 of the mould pieces 107 and 108 and by the arms 133 and 134 of the C-shaped member 132 to prevent welding taking place therebetween.

By the provision of the apparatus shown in Figure 12 it is possible to quickly and easily make up the mould for receiving the molten cladding metal and at the same time the operator is not directly exposed to the heat of the backing slab 101. If desired, the hydraulic ram units 119, 128, 129, and 137 may be adjustably mounted in the frame 104 so that it is unnecessary to accurately position the backing slab 101 in the frame 104.

Figure 13:
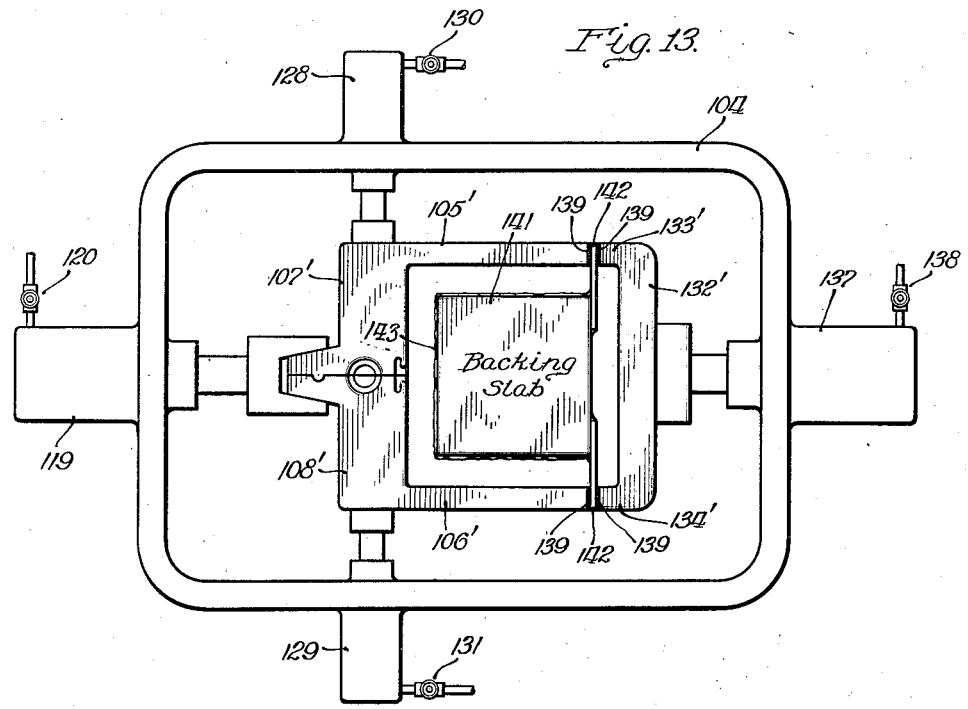
Figure 13 shows a mould construction similar to that shown in Figure 12 but arranged to cast the cladding metal onto three surfaces of the backing slab.

In Figure 13 of the drawings I have shown a mould construction, similar to that shown in Figure 12, but arranged to provide a mould space with three surfaces of a backing slab 141, rather than a single surface. As shown, relatively thin steel strips 142 may be welded to the surface of the backing slab 141 that is not to be clad prior to preheating and cleaning. When the backing slab 141 is deposited on the casting floor, it is provided with the layer 143 of slag or flux for preventing its welding surfaces from oxidization. The mould space is formed in part by the mould sections 107' and 108' and arms thereof 105' and 106' which are juxtaposed with the steel strips 142. Arms 133' and 134' of a C-shaped member 132' serve to back up the opposite sides of the steel strips 142, as described hereinbefore. Suitable strips 139 of asbestos or the like may be positioned on opposite sides of the steel strips 142 to prevent welding of the mould and clamp arms thereto.

Figure 14:
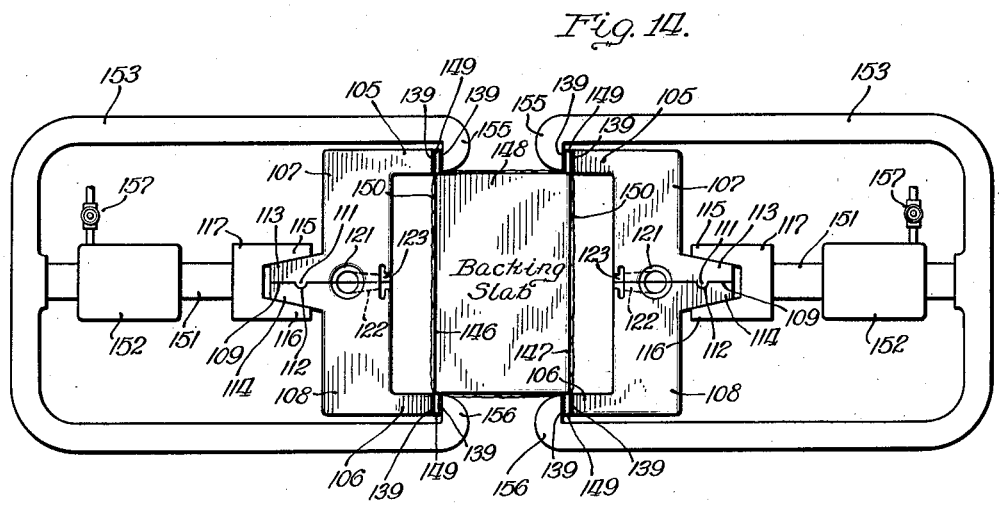
Figure 14 shows a modified form of mould construction for cladding two opposite faces of the backing slab.

In Figure 14 of the drawings I have provided a mould construction that permits the cladding of the opposite surfaces 146 and 147 of a backing slab 148. Prior to cleaning and preheating relatively thin steel strips 149 are welded to the opposite corners of the backing slab 148, as illustrated. The backing slab 148 is then cleaned and preheated to the desired temperature. When the backing slab 148 is placed on the casting floor, its welding surfaces 146 and 147, at least, are covered by the layer 150 of slag or flux to prevent oxidation thereof, as described. A mould space is formed with each of the surfaces 146 and 147 by the two-piece mould 107 and 108, such as shown in Figure 12 and described hereinbefore. The heads 117 carrying the flared jaws 115 and 116 may be mounted on plungers 151 of hydraulic rams 152 which may be mounted on clamp members 153. The outer ends 155 and 156 of the clamp members 153 are turned inwardly to back up the sides of the steel strips 149 opposite the arms 105 and 106 of the mould pieces 107 and 108. Valves 157 may be provided for controlling the flow of fluid from any suitable pressure source to the hydraulic rams 152. Strips 139 of asbestos may be provided on opposite sides of the steel strips 149 to prevent welding thereto of the clamping members.

When the mould construction shown in Figure 14 is employed, it is possible to cast in the mould spaces formed with the surfaces 146 and 147 the same cladding metal or two different cladding metals may be employed. Moreover, the casting may take place at different temperatures. For example, the backing slab 148 may be preheated to a temperature of about 2400° F. Stainless steel, which pours at about 3000° F., may be cast in one of the mould spaces, for example the space formed with the surface 146. The backing slab and cladding metal may then be permitted to cool to about 2250° F., and then a cladding metal of copper or copper alloy may be poured into the mould space formed with the surface 147.

Since certain further changes may be made in the foregoing constructions and methods of operation and different embodiments of the invention may be made without departing from the scope thereof, it is intended that all matter contained in the above description or shown in the accompanying drawings shall be interpreted as illustrative and not in a limiting sense.

I claim as my invention:

1. The method of making composite metal stock which comprises securing metal strips along the vertical edges of the welding surface of a backing slab, securing a vertical mould member in liquid tight relation against said vertical metal strips to form a vertical mould space with said welding surface, and filling the mould space with molten facing metal.

2. The method of claim 1 characterized by preheating the backing slab in a bath of molten glass-like substance.

3. The method of making composite metal stock which comprises securing metal angle strips along the vertical edges of the welding surface of a backing slab, preheating the slab, clamping a vertical mould member in liquid tight relation against said vertical metal angle strips to form a vertical mould space with said welding surface, and filling the vertical mould with molten facing metal.

4. Method of claim 3 characterized by preheating the backing slab in a bath of molten glass-like substance.

5. The method of cladding one vertical face and two adjacent vertical sides of a slab of backing metal which comprises, welding metal strips along the vertical edges of said sides removed from said face, preheating the slab, securing a vertical mould member in liquid tight relation against said vertical metal strips to form a vertical mould space with said vertical face and said adjacent vertical sides, and casting facing metal in the vertical mould space.

6. The method of cladding the opposite vertical faces of a slab of backing metal which comprises, securing metal strips along the vertical edges of said faces to be clad, preheating the slab, securing two vertical mould members in liquid tight relation against said vertical metal strips to form two vertical mould spaces with said vertical faces to be clad, and casting facing metal into the two mould spaces.

7. The method of claim 6 characterized by casting stainless steel in one mould and copper alloy in the other mould.

THOMAS B. CHACE.